(12) United States Patent
Marie (10) Patent No.: US 9,407,329 B2
(45) Date of Patent: Aug. 2, 2016

(54) SECURE NEAR FIELD COMMUNICATION SOLUTIONS AND CIRCUITS

(71) Applicant: NXP B.V., Eindhoven (NL)

(72) Inventor: Julien Marie, Langrune sur Mer (FR)

(73) Assignee: NXP B.V., Eindhoven (NL)

(*) Notice: Subject to any disclaimer, the term of this patent is extended or adjusted under 35 U.S.C. 154(b) by 190 days.

(21) Appl. No.: 13/866,727

(22) Filed: Apr. 19, 2013

(65) Prior Publication Data

US 2014/0315485 A1    Oct. 23, 2014

(51) Int. Cl.
*H04B 5/00*    (2006.01)

(52) U.S. Cl.
CPC .................... *H04B 5/0031* (2013.01)

(58) Field of Classification Search
CPC ...................................... H04B 5/0031
USPC .......................................... 455/41.1
See application file for complete search history.

(56) References Cited

U.S. PATENT DOCUMENTS

| | | | |
|---|---|---|---|
| 2009/0103732 A1 | 4/2009 | Benteo et al. | |
| 2009/0312011 A1* | 12/2009 | Huomo et al. | 455/426.1 |
| 2011/0053504 A1* | 3/2011 | Corda | 455/41.1 |
| 2012/0064828 A1 | 3/2012 | Khan et al. | |
| 2012/0112889 A1* | 5/2012 | Mo et al. | 340/10.1 |
| 2012/0196529 A1* | 8/2012 | Huomo et al. | 455/41.1 |
| 2012/0238206 A1* | 9/2012 | Singh et al. | 455/41.1 |
| 2014/0074722 A1* | 3/2014 | Abel | 705/71 |
| 2014/0162598 A1* | 6/2014 | Villa-Real | 455/411 |
| 2014/0256251 A1* | 9/2014 | Caceres et al. | 455/41.1 |

FOREIGN PATENT DOCUMENTS

| | | |
|---|---|---|
| CN | 101645129 A | 2/2010 |
| CN | 102222368 A | 10/2011 |
| WO | 2009/141764 A2 | 11/2009 |

OTHER PUBLICATIONS

"Updated: XDA devs add Google Wallet to original Nexus S?", NFO World, 4 pgs, retrieved from the internet at: http://www.nfcworld.com/2011/10/03/310436/xda-devs-add-google-wallet-to-original-nexus-s/ (Oct. 3, 2011).

(Continued)

*Primary Examiner* — David Bilodeau (57) ABSTRACT

A device includes a near field communication (NFC) circuit that is configured and arranged to communicate data with external devices. An internal communication circuit communicates data over a microprocessor bus. A secure memory circuit stores an identifier that is unalterable in the secure memory circuit. Logic circuitry performs a secure transaction protocol. The transaction protocol includes determining whether a communication, received by the NFC circuit, is addressed to the secure memory circuit; sending, in response to determining that the communication is addressed to the secure memory circuit, the communication to the memory circuit; sending, in response to determining that the communication is not addressed to the secure memory circuit, the communication to the microprocessor bus; and transmitting data, received from both the NFC circuit and the secure memory circuit, to the NFC circuit, the transmitted data including the identifier value and configured for communication with external devices using NFC.

17 Claims, 5 Drawing Sheets

(56) References Cited

OTHER PUBLICATIONS

"Designed for high-security smart card applications requiring highly reliable solutions", 1 pg retrieved from the internet at: http://www.nxp.com/products/identification_and_security/smart_card_ics/smartmx_contact_interface_controllers/#overview (2011).

Extended European Search Report for Patent Appln. No. 12290155.6 (Oct. 8, 2012).

* cited by examiner

SECURE NEAR FIELD COMMUNICATION SOLUTIONS AND CIRCUITS

CROSS-REFERENCE TO RELATED APPLICATIONS

This application claims the priority under 35 U.S.C. §119 of European patent application no. 12290155.6, filed on May 8, 2012, the contents of which are incorporated by reference herein.

Aspects of the present disclosure relate to apparatuses, devices and methods involving the security of transactions that use near field communication (NFC) circuits.

NFC refers to a short-range, standards-based wireless connectivity technology that has close ties to radio-frequency identification (RFID) technology. NFC uses magnetic field induction to initiate data transfers between electronic devices that are in close proximity. It can be used in combination with identification protocols that validate secure data transfers.

For instance, one or more protocols can be used for contactless purchasing transactions, accessing of digital content and other applications where connection of electronic devices is made simply by touching or bringing devices into close proximity. Certain NFC protocols operate in the standard unlicensed 13.56 MHz frequency band over short distances (e.g., 20 cm or less). Communication data rates can vary including, for example, data transfer rates of 106 kbps, 212 kbps and 424 kbps.

When two devices communicate using NFC, one device can include an NFC reader/writer and another device can include an NFC tag. In some instance, the tag can be implemented as an integrated circuit containing data, connected to an antenna and that can be read and written by the reader. There can be two modes of operation covered by the NFC protocol: active and passive. In active mode, both devices generate a respective radio field. In passive mode, only one device generates a radio field. The other device uses load modulation to use the other device's generated radio field to transfer data. Passive mode can be particularly useful for power saving in the non-generating device, as can be useful for mobile devices like cellular (smart) phones and devices.

Mobile devices, and particularly mobile cellular telephones, have ever increasing uses. Some of these uses include the identification and verification of a person for a variety of different applications. For instance, contactless payment applications can be integrated into mobile devices. The payment application can replace, or supplement, physical (credit/debit) cards, which use a unique number stored on the card (e.g., on a magnetic stripe or as part of data stored in a smart card). Adding such additional uses to mobile devices is not without problems. These problems include, but are not necessarily limited to, security issues relating to the mobile device.

Aspects of the present disclosure relate generally to methods, circuits, and devices for secure transactions using near field communications (NFC) circuits.

In some embodiments, a device includes a near field communication (NFC) circuit that is configured and arranged to communicate data with external devices using NFC. An internal communication circuit is configured and arranged to communicate data over a microprocessor bus. A secure memory circuit stores an identifier that is unalterable in the secure memory circuit. Logic circuitry is configured and arranged to perform a secure transaction protocol. The transaction protocol includes determining whether a communication that is received by the NFC circuit is addressed to the secure memory circuit, sending, in response to determining that the communication is addressed to the secure memory circuit, the communication to the memory circuit, sending, in response to determining that the communication is not addressed to the secure memory circuit, the communication to the microprocessor bus, and transmitting data, received from both the NFC circuit and the secure memory circuit, to the NFC circuit, the transmitted data including the identifier value and configured for communication with external devices using NFC.

Various embodiments of the present disclosure are directed toward a cellular telephone device that includes a cellular communication circuit that is configured and arranged to communicate with telephone cellular towers. A processor is configured and arranged to run an operating system that is designed for use with secured transactions between the cellular telephone and near field communication (NFC) reader devices. A NFC circuit has a secure memory circuit that stores an identifier that is unalterable in the secure memory circuit. The NFC circuit is configured and arranged to communicate data with an NFC reader device using wireless communications transmitted using an antenna, decode communications received from the NFC reader device, access, in response to the decoded communications containing a particular command, the identifier stored in the secure memory circuit, communicate the identifier stored in the secure memory circuit to the NFC reader device, and communicate, to the processor and in response to the decoded communications being addressed to memory space corresponding to the processor, data from the communications received from the NFC reader device.

The above overview is not intended to describe each embodiment or every implementation of the present disclosure. The figures, detailed description and claims that follow more particularly exemplify various embodiments.

Aspects of the present disclosure may be more completely understood in consideration of the detailed description of various embodiments of the present disclosure that follows in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

Embodiments of the present disclosure are believed to be applicable to communication methods, devices and systems relating to secure communications using a contactless reader integrated with a mobile device, such as a cellular telephone. While the present disclosure is not necessarily limited in this context, various aspects of the disclosure may be appreciated through a discussion of related examples.

Embodiments of the present disclosure are directed toward a near field communication (NFC) circuit that contains an unalterable unique identifier. The NFC circuit can be used for secure NFC-based transactions including, but not necessarily limited to, contactless payment transactions using mobile devices (e.g., smart phones).

Consistent with an embodiment of the present disclosure, it has been recognized that various mobile devices may use open source software. The use of open source operating systems can often lead to security risks in which a third party can obtain access to a user's information by accessing memory stored on the mobile device. This information can include, as a non-limiting example, bank account information. Moreover, similar problems may exist even for proprietary operating systems.

For instance, a mobile phone user may undertake a process (sometimes referred to as "rooting" or "jailbreaking") that gives the user control over functions and memory locations that may otherwise be restricted by the operating system. Rooting can allow a user to access restricted memory locations, alter or replace system applications that can protect data and other restricted operations.

In a particular process, an individual can create transfer an image of the memory for one mobile device onto another mobile device. Such an image can include bank account information and/or encryption keys. The newly-imaged device then functions, relative to a payment authorization, as if it were the original device. Thus, an authorized user could pose as the owner of the original device. This can be true even where the data stored in the image is encrypted.

Embodiments of the present disclosure are directed toward a device designed for use with a secure, contactless transaction. The device includes a NFC circuit that is configured and arranged to communicate data with external devices using NFC. For instance, NFC circuits can be designed for use with smart phones and related devices to communicate using radio communication between the NFC circuits and an NFC reader that is in close proximity (several centimeters). A non-limiting example of an NFC application is for use with contactless purchase transactions (e.g., functioning as a traditional credit card or debit card transaction without the card). For example, Google Wallet is a mobile application that stores your credit card information for use on a phone by way of NFC communications. Examples of NFC standards include, but are not necessarily limited to, various radio-frequency identification (RFID) standards such as ISO/IEC 14443 and 18092 as well as various standards defined by the NFC Forum.

The device can also include an internal communication circuit that is configured and arranged to communicate data over a (micro/central) processor bus. This microprocessor bus can, for example, be linked to a central processor or microprocessor of a cellular (smart) phone. For instance, cellular telephones can include one or more processors such as the Texas Instruments OMAP 3430 processor.

A secure memory circuit is included in the device. The secure memory circuit is configured to store an identifier that is not alterable within the secure memory circuit. For instance, the secure memory circuit can be a read-only memory (ROM) circuit that is programmed with the identifier. The unalterable nature of the memory is relative to the in-circuit functionality of the memory circuit. For instance, the secure memory circuit could be initially programmable/writeable (e.g., during manufacturing of the device or memory circuit). After the identifier is store, however, the secure memory circuit can then be configured to prevent modification (e.g., via memory write operations) to the stored identifier. For instance, the identifier can be programmed into memory that is part of an integrated circuit (IC) chip that allows programming of the memory up until the IC chip is placed in circuit. Thereafter, the memory is non-alterable. Another non-limiting example is the use of fuses that, once blown, prohibit alterations to the stored data in the memory circuit. In yet another instance, the UID value is hard coded into the device using individual components and/or electrical connections.

Logic circuitry is also part of the device. This logic circuitry is configured and arranged to implement a transaction protocol between the device and a remote NFC reader device. For instance, the transaction protocol can define a set of communications/data transfers that occur as part of identification and verification for a payment transaction. Such a protocol can include the communication of verification between the devices as well as the use of communication timing and data formatting. Aspects of the present disclosure are based upon the recognition that the use of a logic circuit for such a transaction protocol can provide a number of benefits including, but not limited to, security. For instance, by having the transaction protocol handled by logic circuitry that is separate from the microprocessor and its associated bus, the protocol cannot be easily mimicked (if at all) by the microprocessor. Thus, a compromised operating system for the microprocessor does not necessarily also compromise the transaction protocol.

Aspects of the present disclosure recognize that the use of separate logic circuitry with an unalterable identifier can be particularly useful. For instance, there are a number of different nefarious techniques for obtaining access to secure data (e.g., unique identifiers and bank account numbers). However, by linking the logic circuitry with an unalterable stored identifier/value additional security can be obtained even where the stored identifier is known.

Accordingly, embodiments of the present disclosure include logic circuitry that is configured to determine whether a communication that is received by the NFC circuit is addressed to the secure memory circuit. If the logic circuitry determines that the communication is addressed to the secure memory circuit, then the communication is sent to the secure memory circuit. If, however, the logic circuitry determines that the communication is not addressed to the secure memory circuit then the communication is sent to the microprocessor bus. In some instances, the communication could be sent to neither location. For instance, the communication may be addressed to an invalid memory location or it may be corrupted or even addressed to a yet another data bus, memory circuit or other device.

The logic circuitry can also be configured and arranged to receive data from both the NFC circuit and the read-only memory circuit. This data can then be transmitted to the NFC circuit in a communication format that is configured for communication with external devices using NFC. For instance, the communication format can correspond to aspects from the transaction protocol.

Certain embodiments of the present disclosure are directed toward a cellular telephone device. The telephone device includes a cellular communication circuit that is configured and arranged to communicate with telephone cellular towers. A processor of the device is configured and arranged to run an operating system. The operating system and/or additional applications running therein can be designed for use with secured transactions between the cellular telephone and near field communication (NFC) reader devices.

A NFC circuit is also part of the telephone device. The NFC circuit includes a secure memory circuit that stores an identifier that is unalterable in the secure memory circuit. The NFC circuit can be configured and arranged to communicate data with an NFC reader device using wireless communications transmitted using an antenna. The NFC circuit can then decode communications that have been received from the NFC reader device. In response to the decoded communications containing a particular (secure) command that is part of the transaction protocol, the NFC circuit can access the identifier stored in the secure memory circuit. The accessed identifier can then be communicated to the NFC reader device using the antenna. In response to the decoded communications being addressed to memory space corresponding to the processor, data from the communications received from the NFC reader device can be communicated to the processor.

Consistent with certain embodiments of the present disclosure, the transaction protocol includes the use of a unique identifier. This unique identifier can be used to verify the transaction by confirming the identity of a device user. For example, a smart phone can include a secure memory circuit that stores a unique identifier (UID). The smart phone can provide the UID during as part of the transaction protocol. The operator of the NFC reader device can then verify that the UID matches the smart phone associated with a particular user and/or a particular account (e.g., credit card account, financial/bank account or ticketing account). Logic circuitry in the smart phone can be configured to implement the transaction protocol such that, during a transaction, the UID can only be provided from the secure memory circuit. In this manner, a compromised processor/operating system for the smart phone will not allow the UID to be spoofed or otherwise improperly used. Moreover, creating transferring an image of a user's phone (i.e., the relevant memory contents) to another/second mobile device can be detected because the second mobile device will have a respective and different UID stored in a respective and different secure memory circuit. Thus, preventing the UID from being altered can be particularly useful for a variety of security purposes.

Embodiments of the present disclosure are directed toward an integrated circuit (IC) chip package that contains logic circuitry and a secure memory circuit. The IC chip package can contain a single IC chip that has both the logic circuitry and secure memory circuit or it can contain multiple IC chips and associated modules. In one or more embodiments, the IC chip package can include one or more security features. For example, sensors can be included to detect tampering with the IC chip package or to detect tampering with various signals provided to the IC chip package. For instance, the sensors can detect problems with clock frequency, temperature, supply voltage, fault injection attacks and light sensors. The IC chip package can also include one or more electronic fuses that provide safeguarded mode control and/or active shielding to protect from externally-injected signals and from attempts to monitor of internal signals.

Embodiments of the present disclosure contemplate a mobile device having both a processor IC chip and an NFC-capable IC chip located on a common printed circuit board (PCB). For instance, a smart phone can be constructed with a PCB that houses the core processing devices for the smart phone applications as well as the NFC-capable IC chip. Certain embodiments of the present disclosure are directed toward an NFC-capable circuit that provides various encryption options. For instance, the circuit can provide encryption consistent with one or more of, Advanced Encryption Standard (AES), Data Encryption Standard (DES), triple-DES and/or RSA standards. In various embodiments, on or more coprocessors can be included in the IC chip package to perform the encryption. Various embodiments of the present disclosure can also use hash algorithms (e.g., SHA-1, SHA-224 and SHA-256) and/or Pseudo-Random Number Generators (PRNG) to further protect sensitive data. These enhanced security measures can be used in combination with the secure memory circuit that has an unalterable UID stored therein.

Figure 1:
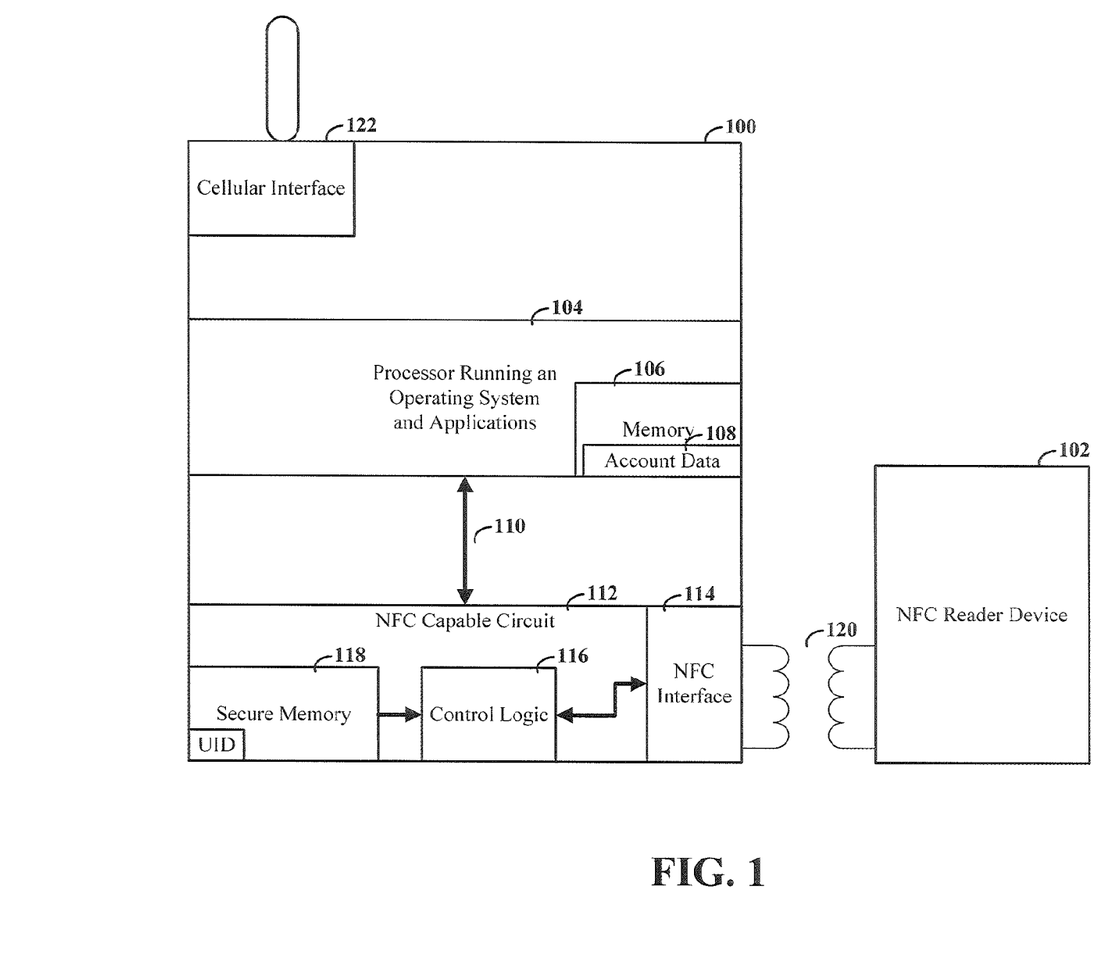
FIG. 1 depicts a system for NFC communications between a mobile device and an NFC reader, consistent with embodiments of the present disclosure.

Turning now to the figures, FIG. 1 depicts a system for NFC communications between a mobile device and an NFC reader, consistent with embodiments of the present disclosure. The system of FIG. 1 includes mobile device 100 and NFC reader device 102, which are designed to communicate using antennas 120. In certain embodiments, mobile device 100 can be a cellular-capable device, as depicted by cellular interface 122. In more particular embodiments, mobile device 100 can be a cellular phone, mobile tablet or similar device. These embodiments are not necessarily limiting, however, and other devices are possible.

Mobile device 100 can include an NFC interface circuit/module 112. This circuit 112 can be designed to interface with the NFC reader device 102 using inductive electrical fields and communication protocols that are consistent with one or more NFC standards. NFC interface module 114 can configured and arranged to communicate with an NFC reader 102 according to such standards and protocols.

Control logic circuitry 116 is configured and arranged to communicate data with NFC interface 114. When an incoming communication is received from NFC interface 114, logic circuitry 116 can be configured and arranged to determine whether the communication is addressed to the secure memory circuit 118. In certain embodiments, the communication can be determined to be addressed to the secure memory circuit 118 when the communication contains a memory address corresponding to the secure memory circuit 118. In other embodiments, the communication can be determined to be addressed to the secure memory circuit 118 when the communication is, or includes, a specific (secure) command corresponding to the secure memory circuit 118. Consistent with certain embodiments of the present disclosure, the specific command can change between transactions. This change can include a modification to format, encryption and/or time during which the command is transmitted. For instance, the secure command can be encrypted using a different key between transactions. The key can be selected from predetermined keys shared between the devices or provided to the mobile device as part of the transaction protocol.

In response to determining that the communication is addressed to the secure memory circuit 118, the logic circuitry 116 can send the communication to the secure memory 118. Secure memory 118 can then be configured and arranged to provide an unalterable UID stored therein in response to the communication. Logic circuitry 116 can then provide the UID to the NFC interface 114. The NFC interface 114 can then provide the UID to NFC reader device 102.

In response to determining that the communication is not addressed to the secure memory circuit 118, the logic circuitry 116 can send the communication to (micro) processor bus 110. Processor bus 110 can be linked to processor 104. Processor 104 can be configured and arranged to run an operating system and one or more software applications. Memory circuit 106 can store data used by processor 104. For instance, the data can include account information (e.g., account data 108) that is useful for processing and completing a secure transaction with the NFC reader device 102. Such data can be communicated to the NFC circuit 112 over processor bus 110. Logic circuitry 116 can then provide the data to NFC interface circuit 114 for communication to the NFC reader device 102. B5

Figure 2:
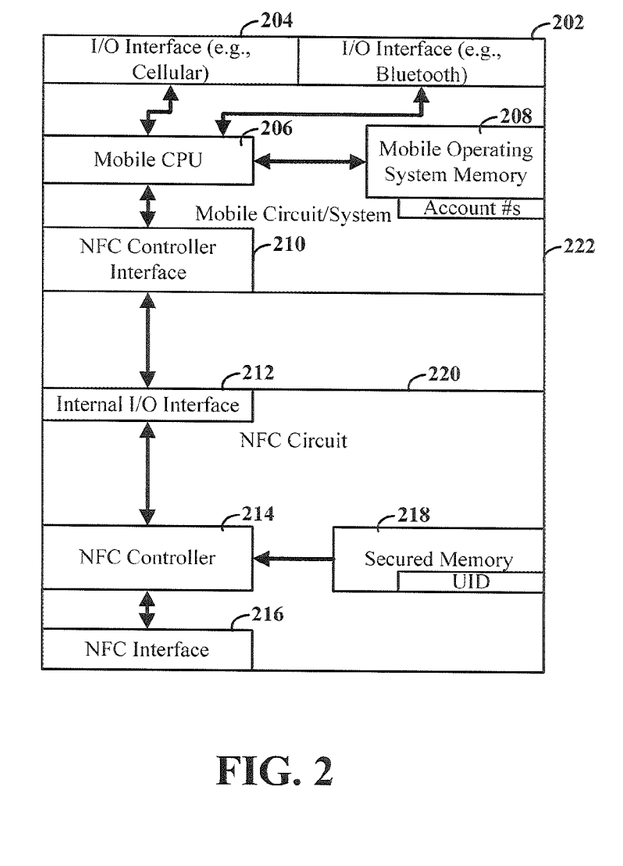
FIG. 2 depicts a block diagram for a mobile device, consistent with embodiments of the present disclosure.

FIG. 2 depicts a block diagram for a mobile device, consistent with embodiments of the present disclosure. The mobile device of FIG. 2 includes an NFC circuit 220 that has an NFC interface 216, which is configured and arranged to carry out NFC communications with one or more NFC readers. Data received from the NFC interface 216 is sent to NFC controller 214. NFC controller 214 can be implemented using logic circuitry that includes, but is not necessarily limited to, discrete circuit components, a processor circuit, specialized circuitry and combinations thereof NFC controller 214 allows access to secured memory 218 in response to communications that request access thereto. Secured memory 218 contains at least a portion of memory that is unalterable. One or more UIDs can be stored in this unalterable potion of the memory.

Internal I/O interface circuit 212 provides an interface between the NFC controller and the mobile circuit/system 222. Consistent with certain embodiments, the mobile circuit/system 222 is a mobile smart phone system containing one or more processor circuits 206. Depending upon the smart phone capabilities, the processor circuit 206 can include microprocessor(s) and/or central processing units (CPUs). Processing circuit 206 can access mobile operating system memory 208 to run the operating system for the mobile system 222 and to run one or more software applications. For instance, the mobile operating system could be an open source (e.g., Android) operating system that is configured to run banking application (e.g., Google Wallet). Accordingly, mobile operating system memory 208 can store one or more account numbers useful for completing financial transactions. In certain embodiments, the mobile device can include one or more I/O interfaces 202, 204 in addition to the NFC interface 216. A few non-limiting examples of I/O interfaces include those compliant with Global System for Mobile Communications (GSM), Bluetooth and/or Wi-fi (e.g., IEEE 802.xx). Other interfaces are also possible.

Figure 3:
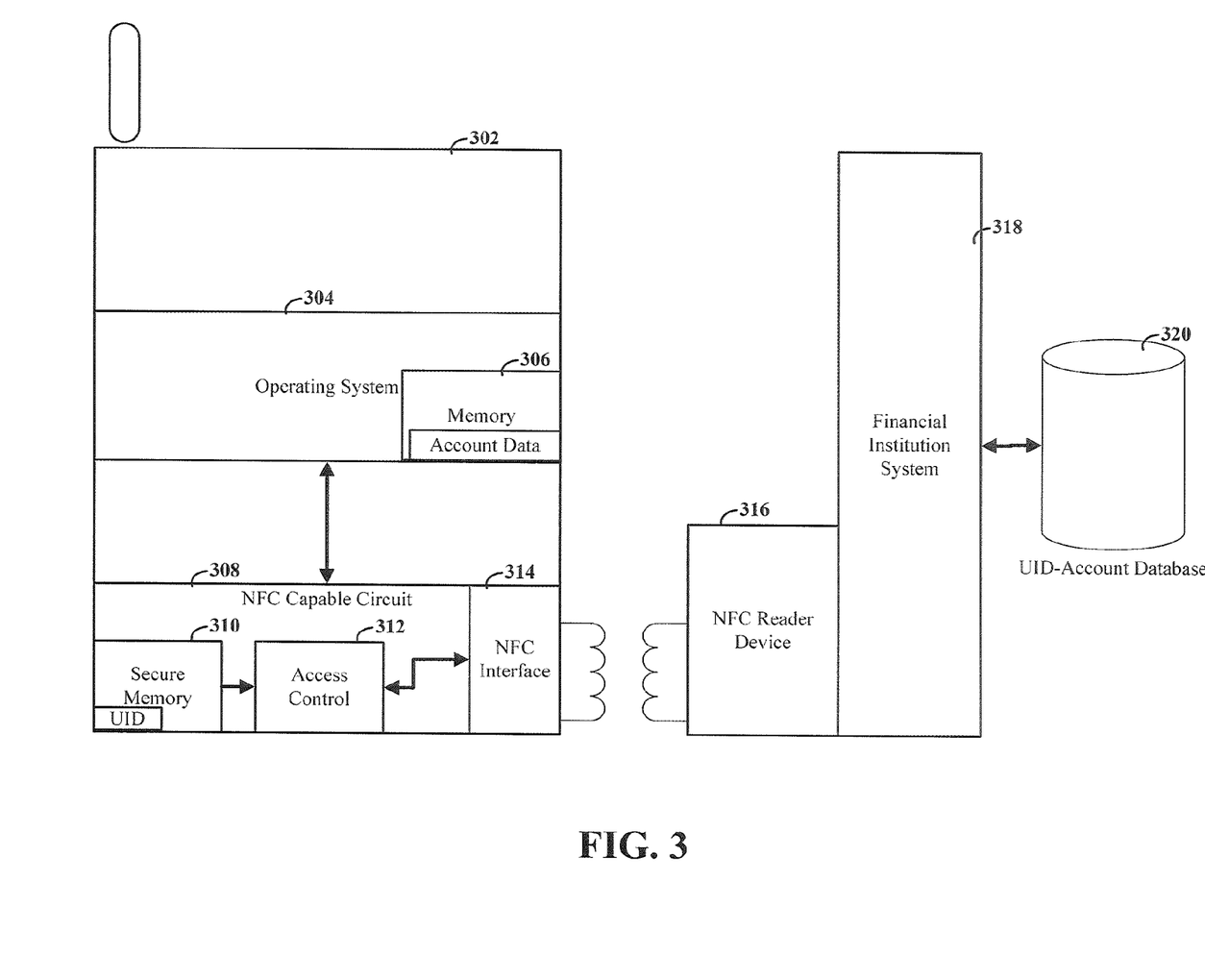
FIG. 3 depicts a system for use with transactions involving a financial institution, consistent with embodiments of the present disclosure.

FIG. 3 depicts a system for use with transactions involving a financial institution, consistent with embodiments of the present disclosure. Mobile device 302 is configured and arranged to run an operating system 304 that has access to memory 306. Memory 306 can include account data for a financial instruction. For example, this account data can include information such as a credit card number or a bank account identifier. An NFC circuit 308 serves as an interface between the operating system 304 and an NFC reader device 316. NFC circuit 308 includes access control module 312, secure memory 310 and an NFC interface module 314. NFC reader device 316 is connected to a financial institution system 318 to assist in completing financial transactions involving the use of mobile device 302. Financial institution system 318 can include, for example, a credit card payment system such as that offered by VISA or Mastercard.

Consistent with embodiments of the present disclosure, a payment transaction can be when a mobile device user presents the mobile device 302 to purchase goods or services. The mobile device 302 is brought in close proximity to the NFC reader device 316. The payment transaction is then completed by initiating a transaction protocol that involves the communication of data between the mobile device 302 and the NFC reader device 316. This communication includes the retrieval of the unalterable UID from secure memory 310. Financial system 318 receives the UID data and uses this data as part of the verification process. For instance, received account and UID data can be compared against corresponding data stored in a UID-account database 320. The purchase transaction can then be approved or denied based upon the results of the comparison.

As discussed herein, embodiments of the present disclosure are directed toward a transaction protocol in which the UID is provided by the NFC circuit 308, which is configured and arranged only to provide the UID that is stored in secure memory circuit 310. Accordingly, even if a third party is able to obtain both the account data and the UID, a different mobile device will provide a different UID because it will not allow the third party to change the UID of the different mobile device.

Consistent with certain embodiments of the present disclosure, the devices can be configured such that the transaction protocol changes the time in a transaction during which the UID is provided (e.g., by having the NFC reader 316 request the UID at a different/random time). This can be particularly useful for preventing attempts to determine the UID from the NFC communications.

Figure 4:
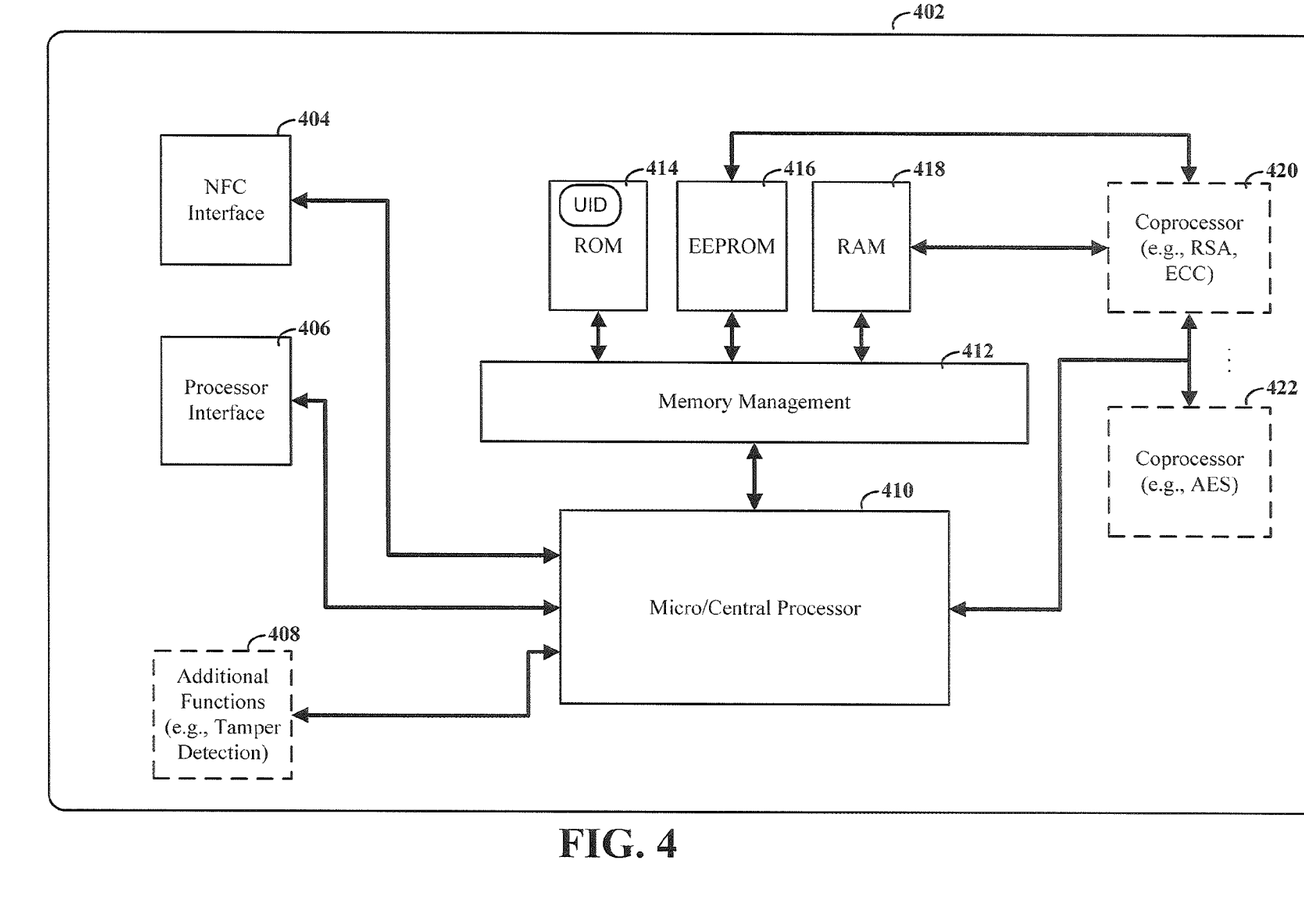
FIG. 4 depicts an integrated circuit chip package for NFC communications, consistent with embodiments of the present disclosure.

FIG. 4 depicts an integrated circuit chip package for NFC communications, consistent with embodiments of the present disclosure. The NFC circuit 402 includes an NFC interface 404 as well as a processor interface 406. Micro/central processor 410 is configured and arranged to process communications received from these interfaces. Memory management circuit 412 controls the interface between processor 410 and various memory circuits. These memory circuits can include, for example, random access memory (RAM) 418, non-volatile memory (e.g., EEPROM) 416 and read only memory (ROM) 414. ROM 414 can be configured to store one or more UIDs. Consistent with certain embodiments ROM 414 can be implemented on a separate chip from central process 410. Both chips can be contained within a single integrated circuit chip package.

Embodiments of the present disclosure can include one or more coprocessors 420/422, which can be configure to carry out one or more specialized tasks including, but not limited to, encryption and decryption of data being communicated to external circuits. In certain embodiments, one more additional functions 408 can also be provided by the NFC circuit 402. For instance, additional security measures can detect tampering of the integrated circuit chip package or of signals provided thereto.

Figure 5:
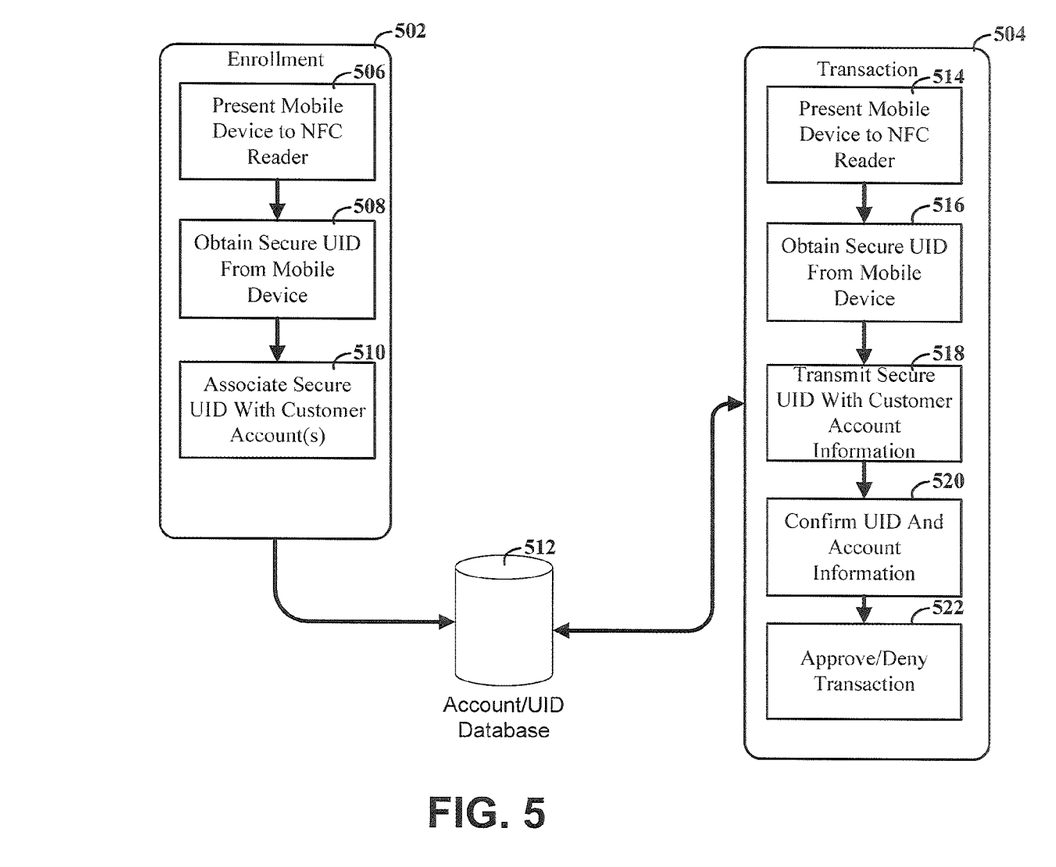
FIG. 5 depicts a flow diagram for use with an NFC-capable device with a secure UID, consistent with embodiments of the present disclosure.

FIG. 5 depicts a flow diagram for use with an NFC-capable device with a secure UID, consistent with embodiments of the present disclosure. Flow/process 502 represents an algorithm for enrolling a mobile device for use in payment transactions carried out over NFC communications. The mobile device is first presented to an NFC reader (506) that is connected to the financial institution. This NFC reader can be a special reader that has elevated privileges to allow for enrollment of new mobile devices (e.g., an NFC reader operated and controlled by the financial institution, rather than point-of-sale NFC readers). The NFC reader then obtains the UID from the mobile device (508) and associates the UID with a customer account (510).

For instance, a customer of a bank may enroll by bringing their smart phone to a branch location. A bank employee can confirm the identity of the customer as well as the bank account information. The smart phone can then be brought into close proximity to an NFC reader device, which is linked to a database 512 that stores the UIDs for enrolled customers.

Thereafter, a customer with an enrolled mobile device may attempt to complete payment transactions (504). The customer can present the mobile device to an NFC reader (514). In certain embodiments, the NFC reader can be operated by a merchant selling goods or services to the customer. The NFC reader then obtains the UID from the mobile device using a payment protocol (516). In addition, customer account information can be collected. The UID along with the account information is transmitted (518) from the NFC reader to a bank's payment processing system. The bank's payment processing system can confirm the transaction by comparing (520) the received account information and UID with data stored in database 512. Based upon this comparison, the payment transaction can be either approved or denied (522).

The specific payment transaction algorithm described in connection with FIG. 5 is a non-limiting example. Variations on this algorithm are possible including, for example, the use of customer entered pin numbers as part of an additional confirmation.

The various embodiments as discussed herein may be implemented using a variety of structures and related operations/functions. For instance, one or more embodiments as described herein may be computer-implemented or computer-assisted, as by being coded as software within a coding system as memory-based codes or instructions executed by a logic circuit, computer processor or microprocessor. Such computer-based implementations are implemented using one or more programmable or programmed circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium that stores instructions that, when executed by a processor, performs one or more of the steps, methods or processes described herein. These applications and embodiments may also be used in combination; for instance certain functions can be implemented using discrete logic (e.g., a digital circuit) that generates an output that is provided as an input to a processor. For instance, received data can be processed using a combination of logic circuitry and a processing circuit configured using firmware or other software.

While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

The invention claimed is:

1. An integrated circuit (IC) chip package comprising:
  a near field communication (NFC) interface configured and arranged to communicate data with external devices using NFC;
  an I/O interface configured and arranged to communicate data with a processor of a mobile device over a processor bus;
  a secure memory circuit that stores a unique identifier of the secure memory circuit that is unalterable in the secure memory circuit; and
  logic circuitry configured and arranged to perform a secure transaction protocol that includes
    determining whether a communication for a contactless purchase transaction that is received by the NFC interface is addressed to the secure memory circuit,
    sending, in response to determining that the communication for the contactless purchase transaction is addressed to the secure memory circuit, the communication to the secure memory circuit,
    sending, in response to determining that the communication for the contactless purchase transaction is not addressed to the secure memory circuit, the communication to the processor bus, and
    transmitting data, received from both the I/O interface and the secure memory circuit, to the NFC interface for transmission to an NFC reader to implement the contactless purchase transaction, the transmitted data including customer account information received via the I/O interface for the contactless purchase transaction and the unique identifier received from the secure memory circuit for the contactless purchase transaction;
  wherein the logic circuitry is configured to implement the secure transaction protocol such that, during a transaction, the unique identifier can only be transmitted to the NFC interface from the secure memory circuit.

2. The device of claim 1, further including one or more coprocessors configured and arranged to encrypt the unique identifier that is unalterable before it is transmitted to the NFC interface.

3. The device of claim 1, wherein the secure memory circuit is a read-only memory circuit.

4. The device of claim 1, wherein the logic circuitry is further configured and arranged to determine whether the communication from the NFC interface is addressed to the secure memory circuit by detecting a secure command that is part of the transaction protocol.

5. The device of claim 4, wherein the logic circuitry is further configured and arranged to detect the secure command in different formats between different transactions.

6. The device of claim 1, wherein the secure memory circuit is at least one of one-time writeable, write-disabled by a fuse, and hard-coded.

7. The device of claim 1, wherein the device further includes tamper protection circuitry for detecting tampering with the IC chip package.

8. A cellular telephone device comprising:
  a cellular communication circuit configured and arranged to communicate with telephone cellular towers;
  a processor configured and arranged to run an operating system that is configured and arranged to perform secured contactless purchase transactions between the cellular telephone and near field communication (NFC) reader devices;
  a NFC circuit that is separate from the processor and connected to the processor via a processor bus, the NFC circuit having an NFC interface and a secure memory circuit that stores a unique identifier that is unique to the secure memory circuit and that is unalterable in the secure memory circuit, the NFC circuit configured and arranged to
    communicate data with an NFC reader device using wireless communications transmitted using an antenna of the NFC interface to implement a contactless payment transaction,
    decode communications received from the NFC reader device via the NFC interface for the contactless payment transaction,
    access, in response to the decoded communications containing a particular command for the contactless payment transaction, the unique identifier stored in the secure memory circuit,
    communicate the unique identifier stored in the secure memory circuit to the NFC reader device via the NFC interface to implement the contactless payment transaction, wherein the NFC circuit is configured to implement the contactless payment transaction such that, during the contactless payment transaction, the unique identifier can only be transmitted to the NFC interface from the secure memory circuit, communicate, to the processor and in response to the decoded communications being addressed to memory space corresponding to the processor, data from the communications received from the NFC reader device via the NFC interface, and communicate customer account information that is stored in the memory space corresponding to the processor and received from the processor bus to the NFC reader device via the NFC interface to implement the contactless payment transaction.

9. The device of claim 8, wherein the operating system is an open source operating system.

10. The device of claim 8, wherein the secure memory circuit is a read-only memory circuit.

11. The device of claim 8, wherein the NFC circuit is contained within an integrated circuit package and wherein the device further includes a printed circuit board housing both the integrated circuit package and the processor.

12. The device of claim 8, wherein the cellular telephone device includes an antenna connected to the NFC circuit and configured and arranged for communicating using magnetic induction fields.

13. The device of claim 8, wherein the NFC circuit is further configured and arranged to encrypt data communicated to the NFC reader device.

14. The device of claim 8, wherein the operating system is configured and arranged to perform secured transactions by executing a stored software application.

15. The device of claim 8, wherein the NFC circuit includes tamper detection circuitry that includes one or more sensors for detecting invalid levels for incoming data signals.

16. The device of claim 8, wherein the secure memory circuit is at least one of one-time writeable, write-disabled by a fuse, and hard-coded.

17. An NFC circuit comprising:

a near field communication (NFC) interface configured and arranged to communicate data with an NFC reader using NFC to implement a contactless payment transaction;

a processor interface configured and arranged to communicate with a processor of a mobile device over a processor bus to implement the contactless payment transaction;

a secure memory circuit configured to store a unique identifier that is unalterable once the unique identifier is stored within the secure memory circuit; and logic circuitry, located in a data path between the NFC interface, the processor interface, and the secure memory circuit, configured and arranged to perform a secure transaction protocol to implement the contactless payment transaction that includes:

determining whether a communication that is received by the NFC interface is addressed to the secure memory circuit;

sending, in response to determining that a communication is addressed to the secure memory circuit, the communication to the secure memory circuit and receiving the unique identifier from the secure memory circuit in response to the communication;

sending, in response to determining that a communication is not addressed to the secure memory circuit, the communication to the processor bus and receiving customer account information via the processor bus in response to the communication; and sending the unique identifier and the customer account information to the NFC interface for transmission to an NFC reader to implement the contactless payment transaction;

wherein the logic circuitry is configured to implement the secure transaction protocol such that, during the contactless payment transaction, the unique identifier can only be transmitted to the NFC interface from the secure memory circuit.

\* \* \* \* \*